United States Patent
Anbukkarasu et al.

(10) Patent No.: US 11,551,195 B2
(45) Date of Patent: Jan. 10, 2023

(54) SYSTEMS AND METHODS FOR PROVIDING SERVICES TO SMART DEVICES CONNECTED IN AN IOT PLATFORM

(71) Applicant: TATA CONSULTANCY SERVICES LIMITED, Maharashtra (IN)

(72) Inventors: Annamalai Anbukkarasu, Bangalore (IN); Aditya Arun Walimbe, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 200 days.

(21) Appl. No.: 15/652,874

(22) Filed: Jul. 18, 2017

(65) Prior Publication Data
US 2019/0026716 A1 Jan. 24, 2019

(51) Int. Cl.
*G06Q 20/20* (2012.01)
*G06Q 20/38* (2012.01)
*H04L 9/40* (2022.01)
*G06F 9/54* (2006.01)

(52) U.S. Cl.
CPC ............ *G06Q 20/20* (2013.01); *G06F 9/547* (2013.01); *G06Q 20/389* (2013.01); *H04L 63/08* (2013.01)

(58) Field of Classification Search
CPC .... G06Q 20/20; G06Q 30/0255; G06Q 20/30; G06Q 20/40; G06Q 20/3821
USPC .......................................................... 705/18
See application file for complete search history.

(56) References Cited

U.S. PATENT DOCUMENTS

| | | | |
|---|---|---|---|
| 10,210,498 B1* | 2/2019 | Meyyappan | G06Q 20/30 |
| 2002/0069176 A1* | 6/2002 | Newman | G06Q 20/04 |
| | | | 705/53 |
| 2007/0083465 A1 | 4/2007 | Ciurea et al. | |
| 2008/0046363 A1 | 2/2008 | Ali et al. | |
| 2009/0006970 A1* | 1/2009 | Jeffery | H04M 7/0063 |
| | | | 715/733 |
| 2010/0114773 A1 | 5/2010 | Showronek | |
| 2016/0027102 A1 | 1/2016 | Smith et al. | |
| 2016/0119434 A1 | 4/2016 | Dong et al. | |
| 2017/0061521 A1* | 3/2017 | Lee | G06F 3/04842 |
| 2017/0142589 A1* | 5/2017 | Park | H04W 12/06 |

(Continued)

FOREIGN PATENT DOCUMENTS

| | | | | |
|---|---|---|---|---|
| EP | 2224398 A1 | 9/2010 | | |
| WO | WO-2016075301 A1 * | 5/2016 | .......... | G06Q 20/203 |
| WO | WO 2016/118979 A2 | 7/2016 | | |

*Primary Examiner* — Luna Champagne
(74) *Attorney, Agent, or Firm* — Finnegan, Henderson, Farabow, Garrett & Dunner LLP (57) ABSTRACT

Systems and methods for providing services to smart devices connected in an Internet of things (IoT) platform. It detects the user and connected registered smart devices in it's vicinity, authenticates them, and receives and processes various requests from them. The user may also provide inputs in natural language and the invention maps context associated with the user utterance to an intent to utilize the one or more services. It may also generate one or more customized responses for one or more outlier requests based on historical data stored in the database. It may automatically processes payment pertaining to one or more services subscribed by the user, wherein information specific to the payment is obtained based on the configuration preferences stored in a database and the one or more services being analyzed by the Process Orchestration Layer module.

2 Claims, 3 Drawing Sheets

(56) References Cited

U.S. PATENT DOCUMENTS

2017/0359232 A1\* 12/2017 Stoops ................ H04L 41/0686
2018/0091506 A1\* 3/2018 Chow ................. H04L 67/2838
2018/0232734 A1\* 8/2018 Smets .................... G06Q 20/32

\* cited by examiner

SYSTEMS AND METHODS FOR PROVIDING SERVICES TO SMART DEVICES CONNECTED IN AN IOT PLATFORM

TECHNICAL FIELD

This disclosure relates generally to financial institution branded appliance, and more particularly to systems and methods for providing services to smart devices connected in an internet of things (IoT) platform.

BACKGROUND

The Internet of Things (IoT) has metamorphosed over the last few years. Internet of Things (IoT), from eye-wear to cars and smartwatches, is spreading its wings as the technology behind it matures. Connecting various types of electronic devices together for a great experience in the day-to day activities is stated to be the ultimate objective of IOT. In the future, its applications will no doubt impact industry, urban development, healthcare, agriculture and other major ecosystems. Gartner projects there will be 6.4 billion connected things in use worldwide in 2016 (a 30 percent increase from 2015), and that the market will grow to 20.8 billion by 2020.

Internet of Things is attractive for fintech, not only for software and hardware developers, but also for banks and other FinTech companies to enable innovative payment experiences and provide wide range of methods to accept payments using NFC chips, payment apps, sensors, tracking devices, etc. Apart from apps for IOT devices, Fintech companies are also making bold moves and developing customized platforms to integrate IoT with payment applications.

While IoT will undoubtedly affect all sorts of global infrastructures, one of its prime applications is within the private home. By definition, a "smart home" is a house that incorporates advanced automation systems to provide the inhabitants with sophisticated monitoring and control over the building's functions. A smart home may provide its owners with control of lighting, temperature, multi-media, window and door operations and security, as well as the ability to automatically replenish various supplies.

Configuring a complex IoT ecosystem that provides multiple technical services to banks, users and vendors is another challenge. Presently, the IoT devices do not have ability to make financial transactions. This requires multiple devices to be configured independently. Lot of user interference is required for safe and reliable communications and handling of various requests. Many IoT platforms are poorly designed and implemented, using diverse protocols and technologies that may create complex and conflicting configurations. Various approaches such as decentralization and blockchain techniques have been applied but these suffer from various limitations such as scalability issues, storage issues and processing power and time required. Thus, there is a need for a system that automatically identifies a registered user or a vendor, handles various requests even in the absence of a registered user and provides secure and reliable technical solutions to users, payment facilities and vendors through dynamic authentication of each user, each device recognized by the IoT network and each transaction or service domain. Thus, there is a need for an IoT platform which provides for easy set-up, appliance activation, a simple and secure registration of smart devices and enabling or disabling of financial sources.

Security is a major issue in the IoT ecosystem. The massive amounts of personal identification and financial account information may be hacked for illicit financial gains by initiating a massive amount of fraudulent transactions, without any knowledge of the rightful owner. This may typically be done by using breached credit/debit or bank account information. In today's IoT ecosystem, the user has very few reliable tools available to insure that their information and data is safe and cannot be used to complete fraudulent transactions. Some steps have been taken by financial communities to reduce such financial frauds. For example, Visa and MasterCard which act as branding networks in the credit/debit card market, are both introducing enhanced security measures that allow the rightful account owner to add a user name, password, secured pin number etc to their account, which are then required for all transactions initiated via the cards. Further, Visa verified and MasterCard secured code are being rolled out through their participating financial card issuers. However, in spite of these measures millions of accounts and large volume of financial information are getting breached or hacked. Thus, there is a need for system which can eliminate such security threats in IoT ecosystem that caters the needs of multiple banks, users and various financial devices.

None of the aforementioned legacy approaches achieve the capabilities of the herein-disclosed techniques for providing and managing services through connected smart devices or in other words in evolving Internet of Things (IOT) ecosystem. There is a need for improvements.

SUMMARY

Before the present systems and methods, are described, it is to be understood that this application is not limited to the particular systems, and methodologies described, as there can be multiple possible embodiments which are not expressly illustrated in the present disclosures. It is also to be understood that the terminology used in the description is for the purpose of describing the particular versions or embodiments only, and is not intended to limit the scope of the present application. This summary is provided to introduce concepts related to systems and methods for providing services to smart devices connected in an internet of things (IoT) platform and the concepts are further described below in the detailed description. This summary is not intended to identify essential features of the disclosure nor is it intended for use in determining or limiting the scope of the disclosure.

In an embodiment of the present disclosure, there is provided a method for providing services to smart devices connected in an internet of things (IoT) platform, the method comprising: configuring by using a customer interface module (CIM), to provide at least one interface, wherein the at least one interface is configured to receive one or more inputs from a user; configuring by using a configuration module, at least one appliance by the configuration module and registering one or more connected devices to the Internet of Things (IoT) platform; authenticating and providing by using a security module, one or more entitlements specific to the user and the said one or more connected registered devices; receiving y an application programming interface (API) module, one or more requests from the said one or more connected registered devices; analyzing by a process orchestration layer (POL) module, one or more requests received from at least one of the said application programming interface (API) module or the user and enabling one or more functionalities based on the one or more requests; processing by an input processing module, one or more inputs from the user, wherein the said one or more inputs are specific to one or more services to be provided to the user through the said one or more connected registered devices; processing by a personal payment gateway (PPG) module, payment pertaining to one or more services subscribed by the user through the appliance, wherein the information specific to the payment is obtained based on the configuration preferences stored in a database, and the one or more services being analyzed by the said POL module; generating and recommending by using the POL module, targeted offers based on the one or more services utilized by the user; receiving by using a natural language processing (NLP) module, an input comprising a user utterance, and mapping context associated with the user utterance to an intent to utilize the one or more services; detecting by using a presence detection module, presence of the user within the proximity of the appliance, and transmitting one or more requests to the user; and generating by using an adaptive learning engine, one or more customized responses for one or more outlier requests based on historical data stored in the database.

In an embodiment of the present disclosure, there is provided a system for providing services to smart devices connected in an internet of things (IoT) platform, the system comprising: a memory; one or more communication interfaces; one or more hardware processors coupled to said memory through said one or more communication interfaces, wherein said one or more hardware processors are configured to: a customer interaction module (CIM) that is configured to provide at least one interface, wherein the at least one interface is configured to receive one or more inputs from a user; a configuration module that configures at least one appliance and registers one or more connected devices to an Internet of Things (IoT) platform; a security module that authenticates and provides one or more entitlements specific to the user and the one or more connected registered devices; an application programming interface (API) module that is configured to receive one or more requests from the one or more connected registered devices; a process orchestration layer (POL) module that analyzes one or more requests from the application programming interface (API) module or the user, and enable one or more functionalities based on the one or more requests; an input processing module that is configured to process one or more inputs from the user, wherein the one or more inputs are specific to one or more services to be provided to the user through the one or more connected registered devices; a personal payment gateway (PPG) module that is configured to process payment pertaining to one or more services subscribed by the user through the appliance, wherein the information specific to the payment is obtained based on the configuration preferences stored in a database, and the one or more services being analyzed by the POL module; a natural language processing (NLP) module that is configured to receive an input comprising a user utterance, and map context associated with the user utterance to an intent to utilize the one or more services; a presence detection module that detects presence of the user within the proximity of the appliance, and transmits one or more requests to the user; and an adaptive learning engine that is configured to generate one or more customized responses for one or more outlier requests based on historical data stored in the database.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
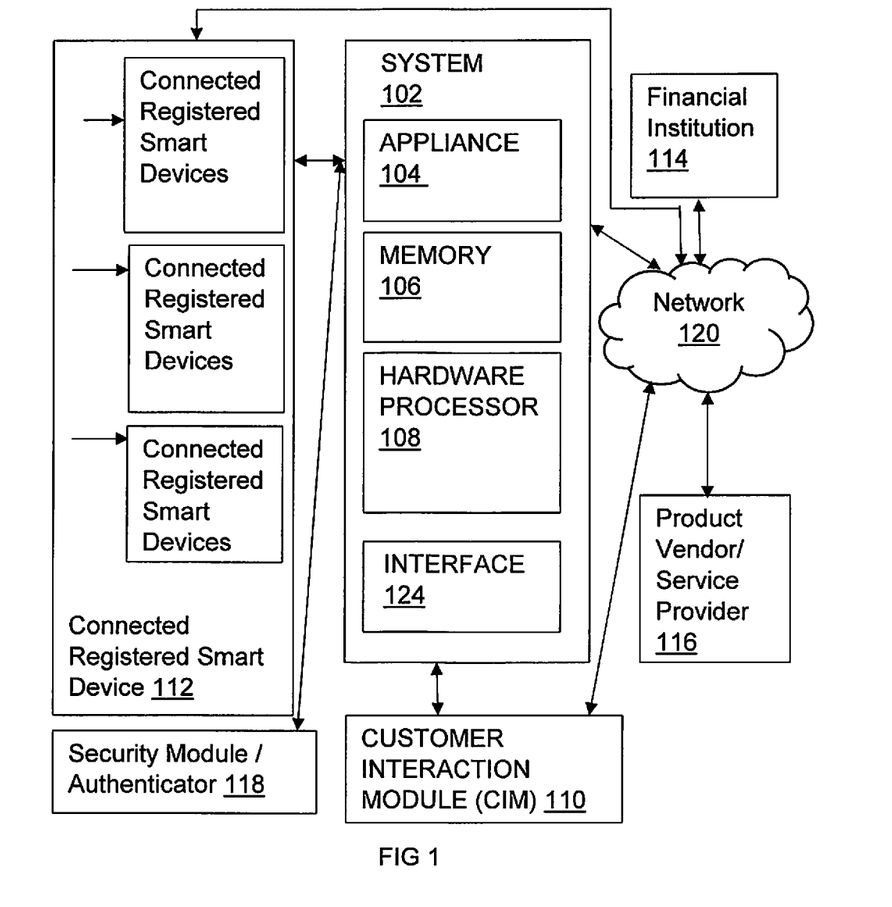
FIG. 1 is a block diagram of a system for providing services to smart devices connected in an internet of things (IoT) platform according to an embodiment of the present disclosure.
Figure 2:
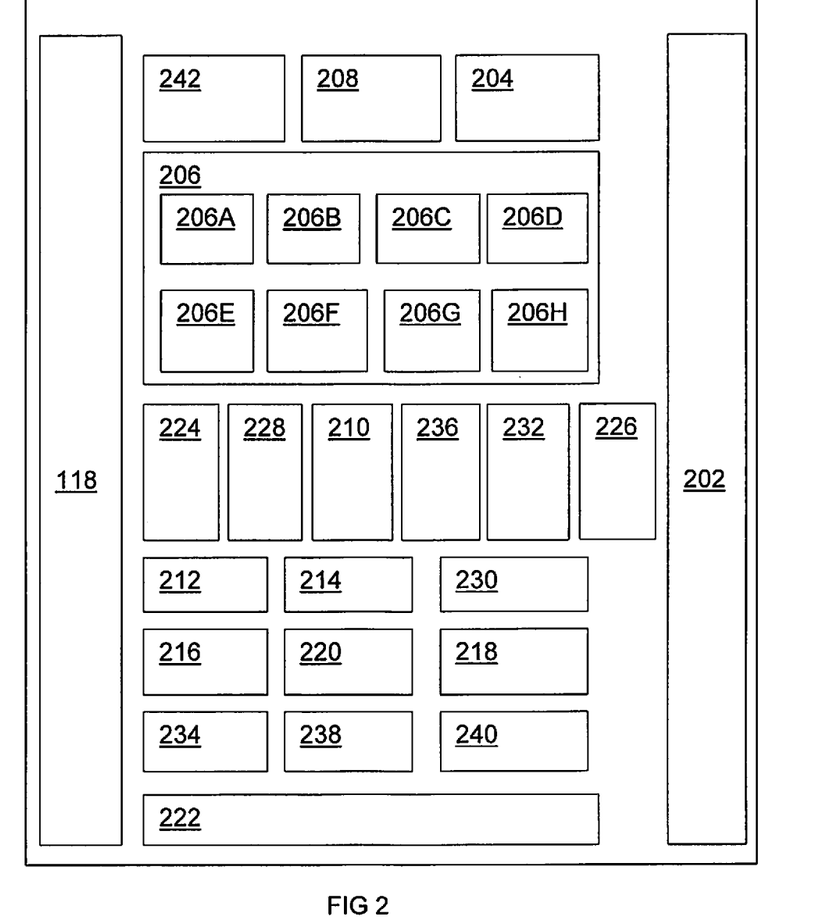
FIG. 2 is a block diagram depicting overall architecture and various modules of the appliance according to an embodiment of the present disclosure.
Figure 3:
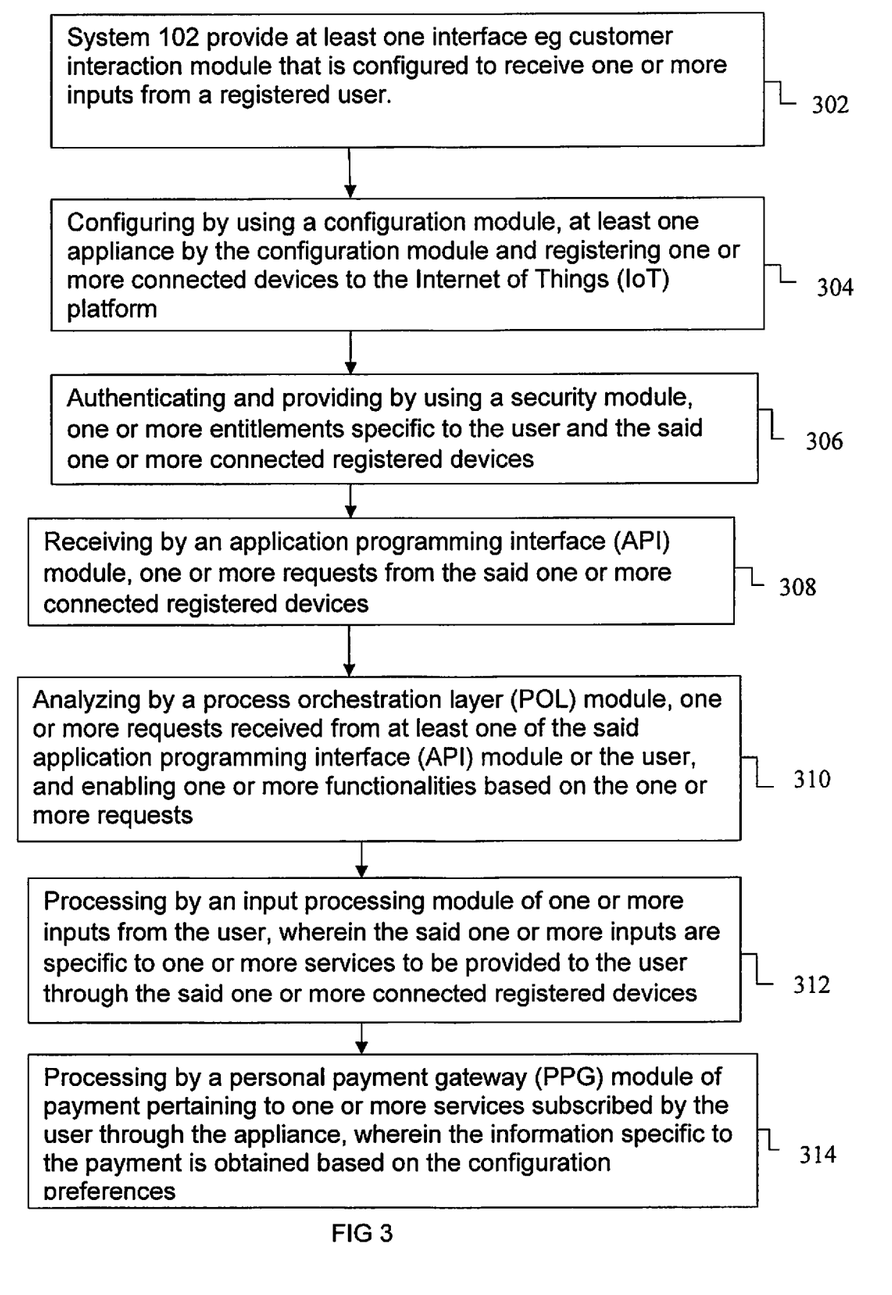
FIG. 3 is a flow diagram illustrating a processor implemented method using financial institution branded appliance FIG. 1 according to an embodiment of the present disclosure.

Referring now to the drawings, and more particularly to FIG. 1 through 3, where similar reference characters denote corresponding features consistently throughout the figures, there are shown preferred embodiments and these embodiments are described in the context of the following exemplary system and/or method.

FIG. 1 illustrates an exemplary architecture 100 for providing services to one or more smart devices connected in an Internet of Things (IoT) platform in accordance with an embodiment of the present disclosure. In an embodiment, the architecture 100 comprises a system 102 that includes an appliance 104, one or more data storage devices 106 (or a memory) operatively coupled to the one or more hardware processors 108 and is configured to store instructions for execution of steps of the present disclosure by the one or more processors. The architecture 100 further comprises a Customer Interaction Module (CIM) 110, one or more connected devices 112A-N (collectively referred as connected device 112), one or more financial institutions 114A-N (collectively referred as a financial institution 114), and one or more service providers 116A-N (collectively referred as a service provider 116). The architecture 100 may further comprise an authenticator 118 (or also referred a security module 118), and a network 120 that connects the appliance 104, the CIM 110, the financial institution 114, the service provider 116. In an embodiment of the present disclosure, the appliance 104 may form an integral part of the connected device 112. In another embodiment of the present disclosure, the appliance 104 may be implemented as at least one of a logically self-contained part of a software program, a self-contained hardware component, and/or, a self-contained hardware component, with a logically self-contained part of a software program embedded into each of hardware component(s) of the connected device 112 that when executed perform method described herein. In an embodiment of the present disclosure, the CIM 110 and the security module 118 may be residing within the appliance 104.

FIG. 2, with reference to FIG. 1, is a block diagram of the appliance 104 in accordance with an embodiment of the present disclosure. The appliance 104 comprises the CIM 110, the security module 118, a configuration module 202, an application programming interface (API) module 204, a process orchestration layer (POL) module 206, an input processing module 208, a personal payment gateway (PPG) module 210, a natural language processing (NLP) module 212, a presence detection module 214, and an adaptive learning engine 216.

FIG. 3, with reference to FIGS. 1-2, illustrates an exemplary flow diagram of a method for providing services to smart devices connected in the IoT platform in accordance with an embodiment of the present disclosure. In an embodiment, the system 102 comprises one or more data storage devices or the memory 106 operatively coupled to the one or more hardware processors 108 and is configured to store instructions for execution of steps of the method by the one or more processors 108.

The steps of the method of the present disclosure will now be explained with reference to the components of the appliance 104 as depicted in FIG. 2, and the flow diagram. According to an embodiment of the present disclosure referring to FIG. 1, the appliance 104 may be requested by any existing user (e.g., customer). The appliance 104 may be provided by one or more entities (e.g., the financial institution 114). This communication between the user and the financial institution 114 may comprise of a link or application store reference to downloadable location to the Customer Interaction Module (CIM) 110. The Customer Interaction Module (CIM) 110 may also be embedded in current Banking application. In an embodiment of the present disclosure, at step 302, the system 102 provide at least one interface (e.g., by using the CIM 110), wherein the at least one interface is configured to receive one or more inputs from a user. In an embodiment of the present disclosure, at step 304, at least one appliance (e.g., the appliance 104) is configured and the one or more connected devices (e.g., the connected device 112) for example a washing machine are registered to the Internet of Things (IoT) platform, by using the configuration module 202. In an embodiment of the present disclosure, the appliance 104 and the connected device 112 may be configured and registered (e.g., by the user) through one or more communication channels being established, for instance, WI-FI or any local area network (LAN) or by any other internet connection and activate the appliance 104 by entering his/her credentials. This appliance 104 when powered ON may trigger an inbuilt Wi-Fi module which by default operates in a router mode emitting a local SSID (say "ABC Bank"). The customer (or also referred as user) may then scan for the SSID of the appliance 104 and depending on the input request through an application or browser, the API module 204 (or a Web Server) may trigger and handle the interaction between the customer and the appliance 104. In an embodiment of the present disclosure, at step 306, the security module 118 authenticates and provides one or more entitlements specific to the user and the one or more connected registered devices 112. In an embodiment of the present disclosure, at step 308, the application programming interface (API) module 204 receives one or more requests, for example a connected registered ABC brand washing machine can request for payment to run the current cycle, from the one or more connected registered devices 112. In an embodiment of the present disclosure, at step 310, the process orchestration layer (POL) module 206 analyzes the one or more requests from the application programming interface (API) module or the user, and enables one or more functionalities for example, for the above scenario of payment request from the washing machine POL 206 can validate the request using security/entitlements and forward to Personal payment gateway, based on the one or more requests. In an embodiment of the present disclosure, based on the one or more requests, the POL module 206 may trigger connected device setup flow for the activation of the appliance 104. Communication between the CIM 110 and browser to the API module 204 and the web server may be established through TCP/IP communication. In an embodiment of the present disclosure, at step 312, the input processing module 208 processes one or more inputs from the user, wherein the one or more inputs are specific to one or more services for example, the ABC branded Washing machine can periodically update smart contracts within the local memory or synchronize the balance credits available etc. to be provided to the user through the one or more connected registered devices 112. In an embodiment, when the one or more inputs are in the form of an audio or user voice (or user utterance), the appliance 104 may invoke a natural language processing (NLP) module 212 residing the system 102 that extracts the user utterance, and maps context associated with the user utterance to an intent to utilize the one or more services.

In an embodiment of the present disclosure, at step 314, the personal payment gateway (PPG) module 210 processes payment pertaining to one or more services subscribed by the user through the appliance, wherein information specific to the payment is obtained based on the configuration preferences stored in a database (residing in the appliance 104—not shown in FIGS), and the one or more services being analyzed by the Process Orchestration Layer module 206.

Upon user utilizing one or more services, the Process Orchestration Layer module 206 may generate and recommend targeted offers based on the one or more services utilized by the user. For example, if the user has utilized a smart device (e.g., washing machine for 2 washes) by making a payment 5$, for subsequent utilization of the same smart device (e.g., the washing machine) by the user, the appliance 104 may learn this pattern of usage and generate and recommend targeted offers (e.g., 15% discount on 2 washes). In an embodiment of the present disclosure, the appliance 104 may further comprise a presence detection module (may be integrated with the security module) that detects presence of the user within the proximity of the appliance 104, and transmits one or more requests to the user.

For example, when the user is detected, the appliance 104 may authenticate by validating one or more identities (e.g., via SMS confirmation, user utterance, a call to his/her mobile communication device, biometric authentication) of the user. User presence may further be leveraged by the appliance 104 in situations where user intervention is required (for example, getting user approval for high value payments) by initiating a request in a preferred modality of customer. Choices of authentication interactions may include, but not limited to touch, text through mobile devices or biometric modes such as voice, touch or through specialty ECG wearables. Conversation in natural language may also be one other mode if preferred by the customer. The ability to detect presence of user in the vicinity and authenticate and then authorize, based on "things" carried by the user may involve the step of triggering the registered presences and authentication modes registered in the first step when the user intervention is required, for example, the expense limit of the "Washing Machine" exceeds 100$, the appliance 104 may look for the user approval. Another step may involve wherein the appliance 104 scans and looks for the user presence from the list of registered present devices and if the user presence is found, it processes authentication, authorization, and requests accordingly. Still further, based on the authentication modality setup, another technique may involve proceeding further if the user is detected and the user may be prompted in a mobile application on his/her mobile communication device to confirm payment. Based on the above step, the intended actions may be performed (e.g., financial action gets completed). It may be noted that the present disclosure provides the ability to scan and trace the Bluetooth devices as authenticators (or the security module) which may also be further extended to other wireless technologies. The security module authenticates the connected registered devices before they use the services of the appliance 104. The security module also authenticates and authorizes the user when the user interaction module (or the CIM 110) is used, or when the presence detection module detects the presence of the user in the vicinity. The alerts and messaging wrapper helps in sending remote notifications through email, SMS or push notifications, based on preferences set by the user. The rules engine module 218 handles rules which may include but not limited to the payment limits set by the user for handling transaction requests at a global level or at specific device level.

In an embodiment of the present disclosure, the system 102 further comprises an adaptive learning engine that generates one or more customized responses for one or more outlier requests based on historical data stored in the database. In an example embodiment, the adaptive learning engine helps understand the user and the ecosystem better through machine learning from the registered connected devices data, as well as goals and preferences set by the user. Based on user opt-in and specific embodiment of the implementation, it can also read through emails, as well as messages and notifications on the mobile communication device.

According to an embodiment of the present disclosure, the working of the architecture of the system for providing services to smart devices connected in an IoT platform may now be understood in detail. In an embodiment, the user may interact with the appliance 104 through the Customer Interaction Module (CIM) 110. The user may then validate himself by entering credentials and the remote banking module (e.g., the financial institution 114) does the requisite validation. The validation may conclude with a token exchange from a Banking server—which is stored in a secured digital vault (not shown in FIGS). Presence of this untampered token in the appliance 104 may indicate an activation of the one or more connected devices 112 (or also referred as 'smart devices').

As the validation of the user may be done through one or more validation means, for instance, device finger print including the device mac id, customer user id, geography/location may be captured for activation of the appliance 104. Post fingerprinting, the above details and user id/credential linkage customer may be presented with a profile management module for setting up one or more profiles and preferences for mandatory/one time setup needs. Preferences for different authenticators, choice of primary or secondary account for financial operations, choice of alerts/notifications, preference of when a smart device can make (or initiate or process) financial decisions are set through this interface. Each of payment sources enabled through the profile management module may conclude with a token provided by a banking module. In an embodiment of the present disclosure, the token may be indicative of an expiry period, following to failure of processing the token, transaction associated with the token may be declined accordingly. The profile data may also be stored in the secured digital vault to prevent any un-authorized access of the data which may also handle encryption and decryption with the authorized user's private key.

In an embodiment of the present disclosure, all the above interaction may be facilitated by the Customer Interaction Module (CIM) 110 that acts as a network between the user and the appliance 104. The CIM or Customer Interaction Module 110 helps in simplifying the user experience while interacting with the appliance 110 and smart devices. The CIM or Customer Interaction Module 110 assists in the activation of one or more functionalities (and the one or more services) as discussed above. The CIM 110 may also enable registration of smart appliances by keying in unique identification number or simply scanning the QR code, or bar code on the appliance 104 using a mobile application. By registration, the smart devices are securely paired with the appliance 104 for its subsequent autonomous operations (for needs such as metering, contractual validations, payment, billing, and the like). While the registration is enabled by mutual concurrence by both the service provider 116 and the financial institution 114, the QR Code or the Product Serial or Unique ID may be used as identifier to register along with a customer reference which may be referred as a Product ID. This Product ID (or Vendor ID) may then be captured through an image capturing module (or image capturing device) from the QR code or keyed in by the customer.

In an embodiment of the present disclosure, when a new connected device (or smart device) requires to be registered to the IoT platform, the user may invokes "add a device" from the CIM 110 (or browser application) provided by the financial institution 114. If the smart device is equipped with an image capturing capability, then an image capturing module may be invoked and QR code is scanned. In case the device does not have image capturing capability, the user may the unique Product ID Manually in the form provided in the browser or the CIM, Application populates the device type, Vendor name, product name automatically by decoding the QR Code or the Unique ID. Subsequently in the same screen (customer interaction screen provided by the CIM 110) customer has the option to select the Funding sources made available by the Bank (Customers own accounts), in addition to simple rules sets and presence/authenticator preferences. The Process Orchestration Language (POL) module 206, Sub-module, device, user, vendor setup module (206 H) may then be invoked for triggering the device registration process. The device and vendor may then be invoked for the registration supported by a cryptography module and a token may be generated which is used by the smart device for subsequent interactions. Generated token may also be stored for future reference/validation in the secured digital vault along with status and expiry date.

The CIM 110 may further provide for registration or enabling of financial sources by providing the customer ability to enable or disable available financial sources for the purposes. In addition he may have the ability to register any third party—funding sources (payment cards etc.). The CIM 110 may further assist in registration of authentication or presence detection modes which is used to identify the registered customer and smart devices presences in the vicinity of the appliance 104. For example, a mobile communication device associated with a user, or a wearable electronic device). The CIM 110 may further enable creation of personal preferences for each of the registered appliances (and/or connected devices 112) for example setting expense limits, acceptable pattern etc. The CIM 110 may provide a user interface and support banking functions, for instance, payments, reviews, offers, etc. through the appliance 104.

As depicted in FIG. 2, the finance interface module 208 establishes secured connectivity pipe with the financial institutions 114. The finance interface module 208 may further include logic for attempting idempotent retries and network error handling in case there is interim connectivity failure. The financial institution may comprise of all capabilities in its data center that are required to support the appliance 104. The appliance 104 may leverage these capabilities over a secured connected on the network. He network may refer to typically the LAN network in the context where the financial appliance is used—for example, in the primary scenario of user's home, this can be the Wi-Fi. However, other relevant protocols such as UPnP, Wi-Fi Direct, adhoc personal networks (PANs) or support for brokers for IoT protocols such as MQTT may also fall within the purview. For connecting to external entities like financial institution and vendor infrastructure, network may refer to internet connectivity.

In an embodiment of the present disclosure, the appliance 104 may act as a virtual or personal finance assistant to the user and may provide advise to the user. Based upon the information registration discussed above, the appliance 104 may provide intelligent inputs (or advise) for the given financial need of the customer with respect to what is best for the customer. For example, if the customer has in the first step registered a savings, current or a credit account in addition to 1 visa and 1 master card, then for an incoming payment need or any utility payment, based on the customer preference (like he wants to get cashbacks or miles or rewards or any additional offers), the appliance 104 may suggest the right funding source. This choice may further be overridden by the customer if needed. The Analytics Engine module 220 implements the payment advisory algorithm to recommend the right funding source for a transaction. Also, it may implement an affordability algorithm to provide right advice regarding big ticket purchases as well as helps in providing right offers to the user. Further, the Rule Engine module 218 may handle rules like payment limits set by the user for handling transaction requests at a global level or at specific device level. Still further, the personal financial management 224 module helps the user in better management of personal finances. This module may further assist to set user goals and may help to provide personalized offers through the offers module, or advice on affordability through the affordability algorithm in analytics engine.

Referring to the presence detection module 214, the process of communication or dialogue between the appliance 104 and user in natural language may now be considered. The Presence Detection Module 214 helps in detecting the presence of the user in the vicinity of the appliance, by virtue of the things carried by the user. Examples of such things may include but not limited to a mobile communication device or Bluetooth Low Energy enabled beacon, ECG based Nymi band in authenticated state, and so on. Suppose a user asks a question or makes a statement or any other utterance to the appliance 104 then such an utterance from user in natural Language, or text entry, either in Customer Interaction Module (CIM) 110 or browser is captured by Natural Language Handler 206A within Process Orchestration Language (POL) 206. Natural Language Handler 206A may then invoke Natural Language Processing module 212. The Natural Language Processing Module 212 resolves the utterance to an intent using an out-of-the-box interaction model. One or more intents may include, but are not limited to, command(s), Affordability and Banking. The Natural Language Processing (NLP) module 212 further does state management as required.

In an embodiment of the present disclosure, the command may comprise OFF & RESTART appliance commands as well as commands accepted by individual modules. Individual module is triggered through Process Orchestration Language to process the given command. Appliance 104 responds back with command completed message including additional information provided by individual module, back to the user. Under the Affordability category, when the intent resolves to affordability category, Process Orchestration Language invokes the Affordability algorithm within the analytics engine. The Affordability algorithm reviews the semantics of the statement and determines if it needs to ask questions for the statement to be more specific. If it needs to ask further questions, the Natural Language Processing (NLP) module 212 is invoked though Process Orchestration Language 206 and question is asked to the user to elicit details. In case no further question is to be asked, the Affordability Algorithm, through Process Orchestration Language (POL) 206 looks for associated goals (using Personal Financial Management module 224), required banking details (using finance Interface module 208), and information in public domain, if required, to make its recommendation. For any further questions, the Affordability algorithm may invoke the Advisory algorithm. When intent resolves to banking category, Process Orchestration Language (POL) 206 invokes the finance Interface module 208 to get the requisite data and then make the recommendation.

According to yet another embodiment, method and scenario for appliance initiated dialogue may now be considered. A module within the appliance 104 generates an event that needs user intervention and posts it to the Event Hub 206C within Process Orchestration Language (POL) module 206. The Event Hub 206C within Process Orchestration Language (POL) module 206 then invokes Rules Engine module 218 to determine if user accepts outbound natural language interaction for the event. Push notification or email is sent for the event if the user has opted-in, else it is queued for user information or action. The queue can be managed through customer interaction module 110. If not Process Orchestration Language (POL) 206 invokes Presence Detection Module 214 to check for presence of user. Push notification or email is sent for the event if the user has opted-in, else it is queued for user information or action. The queue can be managed through customer interaction module. Else, Presence Detection Module 214 looks for presence of authenticating object(s). Process Orchestration Language (POL) 206 through Natural Language Processing (NLP) module 212 attempts to initiate a dialogue with the user. Push notification or email is sent for the event if the user has opted-in. Else, Process Orchestration Language (POL) 206 through Natural Language Processing (NLP) module 212 informs the user of the event, or seeks approval of the action it intends to take through a "YES/NO" question (Please say "YES" to approve). Process Orchestration Language (POL) 206 may then take the required action if user approves, and sends an event back to the module sending the original event, if required.

Suppose a user asks a question or makes an utterance as "Hi appliance, please set my MasterCard as payment card for the washing machine". Natural Language Handler 206A within Process Orchestration Language (POL) 206 captures an utterance from the user "Hi appliance, please set my MasterCard as payment card for the washing machine" and invokes Natural Language Processing module 212. Natural Language Processing Module 212 initiates a context for the utterance. The Natural Language Processing (NLP) Module 212 resolves the utterance to a Command using an out-of-the-box interaction model. The Natural Language Processing (NLP) Module 212 sends information request event to Event Handler 206C within Process Orchestration Layer module 206 for retrieving all MasterCard branded cards as well as retrieving all washing machines. Event Handler 206C within Process Orchestration Layer (POL) 206 Module queries Secure Digital Vault that returns two MasterCards—Mastercard Sapphire and MasterCard Travellers. Event Handler 206C within Process Orchestration Layer (POL) 206 Module queries Device and Vendor Management module 226 for washing machines XYZ brand and Washing machine is returned. Event Handler 206C communicates results to Natural Language Processing (NLP) module 212 which then confirms presence of washing machine. Natural Language Processing (NLP) module 212 saves session state. Natural Language Processing (NLP) module 212 through Natural Language Handler 206A in Process Orchestration Language (POL) module 206 asks the user "OK sure. Would you like to use the MasterCard Sapphire ending with 0001 or MasterCard ending with 2694"? Natural Language Handler 206A within Process Orchestration Language (POL) module 206 captures an utterance from the user "MasterCard Sapphire please" and invokes the Natural Language Processing Module 212. Natural Language Processing Module 212 interprets this utterance within the earlier context. Natural Language Processing Module 212 understands the utterance and responds back "OK. I am updating the default card for XYZ Brand Washing Machine to Mastercard Sapphire. Please respond "YES" to confirm. Natural Language Processing Module 212 understands the "Yes please" utterance from the user though the same mechanism. It then sends a Rules Update event to Event Hub 206C within Process Orchestration Layer (POL) module 206. Event Hub 206C within Process Orchestration Layer (POL) module 206 invokes Rules Engine module 218 for the rule update. Finally, Event Hub 206C within Process Orchestration Layer (POL) module 206 communicates success back to Natural Language Processing (NLP) module 212 that says "Thanks. OK. I have updated the default card for XYZ Brand Washing Machine to Mastercard Sapphire. Is there anything else I can help you with today".

Considering another scenario, suppose a user asks a question or makes an utterance as "Hi appliance, can I afford to buy a BMW car now". Natural Language Handler 206A within Process Orchestration Layer (POL) module 206 captures an utterance from the user "Hi appliance, can I afford to buy a BMW now" and invokes Natural Language Processing module. Natural Language Processing Module 212 a fresh context for the utterance. Natural Language Processing Module 212 resolves the utterance to Affordability using an out-of-the-box interaction model. Process Orchestration Layer (POL) module 212 invokes the Affordability Algorithm within the analytics engine module 220. Analytics engine reviews the semantics of the statement and understands the question to be about an inbuilt category of cars, but missing specifics like model. Process Orchestration Layer (POL) module 206 responds back to Natural Language Processing (NLP) module 212 on the additional data requirement. Natural Language Processing (NLP) module 212 responds back to the user "Let me check. Can you please let me know the model of the car of BMW make you are looking for?" Natural Language Processing (NLP) module 212 module through the same mechanism, understands the user utterance as "Uhh . . . say the BMW 7 series". Process Orchestration Layer (POL) module 206 invokes the Affordability Algorithm within the analytics engine module 220. Affordability Algorithm then posts the information request events to the Event Hub 206C within Process Orchestration Layer (POL) module 206 which may include financial inflow and outflow information, bank deposits and loan information, BMW car price information etc. The Event Hub 206C within Process Orchestration Layer (POL) module 206 may then trigger Personal Financial Management (PFM) module 224 for financial inflow/outflow information, retrieves banking information through the banking interface module, gets price information on "BMW 7 series" cars over the internet and offers and financing options in public domain (e.g., BMW Financial Services), auto loan information from the bank for the user and credit score through the bank. Event handler 206C within Process Orchestration Layer (POL) module 206 sends required information to the Advisory Algorithm. Advisory Algorithm makes affordability calculation and sends back a narration statement to Natural Language Processing (NLP) module 212 through Process Orchestration Layer (POL) module. Natural Language Processing (NLP) 212 module then conveys following message to the user: "The following statements do not construe as financial advise and are based on limited information available to me. Disclaimers as mentioned in signed T&C apply for the following messages. I am happy to inform you that you have sufficient finances to lease the BMW 7 series sedan for $889/mo. However, should you want to buy the car at MSRP of $81,500, ABC bank will be happy to extend a loan of $50,000 to you. Let me know if I should request your relationship manager to call you with auto-loan offers."

Considering yet another scenario, suppose a user asks a question or makes an utterance as "Hi appliance, what is my credit card bill for this month". The Natural Language Handler 206A within Process Orchestration Layer (POL) 206 captures an utterance from the user "Hi appliance, what is my credit card bill for this month" and invokes Natural Language Processing module 212. Natural Language Processing Module 212 initiates a context for the utterance. The Natural Language Processing module 212 resolves the utterance to a financial institution request using an out-of-the-box interaction model. Natural Language Processing Module 212 sends Information Request Event for credit card statement to Process Orchestration Layer (POL) 206. Event Hub 206C within Process Orchestration Layer (POL) module 206 invokes financial Interface module 208 to get the information. Event Hub 206C within Process Orchestration Layer (POL) module 206 invokes financial Interface 208 to get the information. Finally, the Process Orchestration Layer (POL) module 206 conveys response to Natural Language Processing module 212 that conveys following message to the user: "Your credit card bill due on Oct. 25, 2016 is $2320 dollars".

According to yet another embodiment, referring to FIG. 1 again, the appliance 104 as a personal payment gateway may now be considered. The appliance may further comprise of an in-built "personal payment gateway" (PPG) module 210 provided, that securely processes the payment needs of a registered customer or registered devices 112. The Personal Payment Gateway (PPG) module 210 makes a payment through the financial interface module 208, or schedules a payment for later, based on request received externally through the Application Programming Interface (API) module 204, or generated by the invoice, mandate module 228. The Application Programming Interface (API) module 204 receives the request which may be through any connected registered smart device 112. The Application Programming Interface (API) module 204 may then invoke the security Module 118 to authenticate the endpoint invoking a corresponding API. The security Module 118 may then authenticate endpoint by checking access token in the request header against the vendor id and device id in the registry database. The Application Programming Interface (API) module 204 may then extract payload from the request irrespective of transport (HTTP, MQTT etc.) and sends it to Process Orchestration Layer (POL) 206 which may scan payload and determines the current request is a payment request. Process Orchestration Layer (POL) 206 may invoke the security module 118 to determine if endpoint has authorization to perform the business function. Process Orchestration Layer (POL) 206 may also invoke the Rules Engine module 218 to determine customer preferences for processing payments for the endpoint. Process Orchestration Layer (POL) module 206 may then invoke Adaptive Learning Engine module 216 to determine if current request appears as outlier or suspicious request. Process Orchestration Layer (POL) 206 determines if payment source is set in endpoint handling rules, or if the rule is set as "determine optimal funding source for transaction".

In case rule payment source is not set in endpoint handling rule, the Process Orchestration Layer (POL) module 206 may determine if user interference is required.

In case payment source is set in endpoint handling rule or in case of a rule for an optimal funding source, the Process Orchestration Layer (POL) module 206 may further invoke the Analytics Engine 220. Analytics Engine 220 invokes the Payment Advisory Algorithm which may then find out transaction details, customer preferences, funding source attributes, user behavior category score and returns optimal funding source for the transaction to Process Orchestration Layer (POL) 206. Based upon the results, Process Orchestration Layer (POL) 206 may then determine if user interference is required.

In case of further user interference is not required, Process Orchestration Layer (POL) module 206 may invoke the Personal Payment Gateway 210 to process the payment. The Personal Payment Gateway 210 may schedule the payment for later if the request is for later date, or else uses the financial interface module 208 to submit the payment. It makes the payment using token against the PAN stored in secure digital vault in secured digital vault module 230.

In case of further user interference, the Event Hub 206C within the Process Orchestration Layer (POL) module 206 may invoke Rules Engine 218 to determine if user accepts outbound natural language interaction for the said event. Push notification or email may be sent for the event if the user has opted-in, else may be queued for user information or action. The queue may be managed through customer interaction module 110. If the user has not opted in, the Process Orchestration Layer (POL) module 206 may invoke the Presence Detection Module 214 to check for presence of user which may look for the presence of registered user or connected smart registered devices 112. Push notification or email may be sent for the event if the user has opted-in, else may be queued for user information or action. In case the user cannot be detected, the Process Orchestration Layer (POL) module 206 through Natural Language Processing (NLP) module 212 may attempt to initiate a dialogue with the user. Push notification or email may be sent for the event if the user has opted-in, else may be queued for user information or action. The Process Orchestration Layer (POL) 206 through Natural Language Processing (NLP) module 212 may then inform the user about payment request and it may be approved. In case further user interference is not required, the Process Orchestration Layer (POL) 206 may invoke the Personal Payment Gateway (PPG) 214 to process the payment.

An example of the appliance 104 may act as an in-built personal payment gateway (PPG) 214 to securely process the payment of a user may now be considered. The API module 204 may receive the payment request from XYZ brand washing machine and may invoke the security module 118 to authenticate the endpoint invoking the Application Programming Interface (API) module 204. Security module 118 may then authenticate endpoint by checking access token in the request header against the vendor id for XYZ Vendor and device id in the registry database. The Application Programming Interface (API) module 204 module may then extract payload from the request (comprising Request Type: Payment, Amount: $22.30, Request Date: Oct. 10, 2016, Request Time: 14:20 hours, Payment Timing: Immediate, Device Transaction ID: 1298597) & sends it to Process Orchestration Layer (POL) 206. The Process Orchestration Layer (POL) module 206 may then scan the payload to determine if the request if payment request and may invoke the Security Module 118 to determine if endpoint has authorization to perform the (business) function. In addition to entitlements, the Process Orchestration Layer (POL) module 206 module may invoke the Rules Engine module 218 to determine customer preferences for processing payments for the endpoint. Rules Engine is configured for automatic payments without explicit user approval. The Process Orchestration Layer (POL) module 206 may then invoke the Adaptive Learning Engine 216 to determine if current request appears as outlier or suspicious request. Adaptive learning Engine 216 determines that appliance is trusted, has a history of payments, the time of the payment is ok (25th of every month) and amount of payment is less than $30 average per month, so it does not consider this as a suspicious request. Process Orchestration Layer (POL) module 206 may determine that payment source within endpoint handling rules is set to "determine optimal funding source for transaction" and invoke analytics engine 220 which may invoke Advisory algorithm. The Advisory Algorithm in Analytics Engine 220 looks at transaction details, customer preferences, funding source attributes, customer behavior category score and returns optimal funding source for the transaction as Visa Electron Card ending in 5287 to Process Orchestration Layer (POL) module 206. The Process Orchestration Layer (POL) module 206 may then determine if user interference may be required and personal payment gateway (PPG) module 210 may be invoked to make the payment which may use the financial institution interface to make such payment.

According to yet another embodiment, referring to FIG. 1 again, the appliance 104 as a service interface for vendors and financial institutions may now be considered. An in-built smart contract system within the appliance 104 may serve as technology ecosystem between a financial institutions, merchants and users. For example a smart device procured in "Pay per Use" may be controlled and managed by these smart contracts involving—customer, financial institution and the product vendor. Device operation or ON/OFF may be governed by Mutual concurrences on an executed agreement like if the bank concurs the payment received, the Vendor concurs for device in normal functioning mode. Similarly for any servicing needs—or even duration of usage etc., smart contracts may be used to reduce manual intervention and perform various function automatically.

The smart contract and blockchain module 232 may help in implementing a blockchain node within the appliance. Smart contracts deployed on this blockchain module 232 may help to create new business models such as pay-by-usage. A Smart contract application programming interface may be invoked or an event may be posted within event hub that needs interaction with smart contract. Process Orchestration Layer (POL) module 206 may then invoke appropriate functions in Smart Contract and blockchain Module 232 and functions within Smart Contract and blockchain Module 232 may interact with blockchain smart contract through JSON-RPC calls.

A scenario of a vendor or financial institution 114 initiated deployment of a smart card may now be considered. Suppose a vendor and a user agree on a financial contract and the user details may be sent to a financial institution 114 by a vendor, who may then verify the existence of user and ownership of the appliance 104 and may then issue and send a token to the vendor 116. The vendor 116 digital may sign the token and send back the same along with user contract form in financial institution's 114 prescribed format encrypted with the financial institution's 114 public key. Financial institution 114 server may verify vendor 116 signature and marks vendor 116 consent flag to TRUE and may further decrypt form payload with financial institution's 114 private key, checks validity of payload format, then encrypts it with public key of the appliance 104 and finally sends encrypted form to the appliance 104 of the user along with the same token. Form may then be presented to the user along with T&C. User consent—in Customer Interaction Module (CIM) 110 or through Natural Language Processing module (NLP) 212 may be obtained. After user acceptance, appliance 104 signs the token with appliance's 104 private key stored and sends it to the financial institution 114 along with the connected smart 112 registered device vendor id. The financial institution 114 server may then compare device id sent by appliance 104 with that sent by vendor 116 earlier and may further verify the appliance 104 signature and sets user consent flag to TRUE. On obtaining both vendor 116 and user consent, financial institution 114 server compiles the payload and deploys it as a smart contract on its node. A smart contract ID may be created and stored along with the contract address. Both are sent to the vendor 116 as well as the appliance 104. Smart contract may then be replicated on vendor 116 and appliance 104 blockchain nodes when they synchronize with the financial institution 114 blockchain node. Vendor 116 may check the deployed contract bytecode at contract address if required. Further, user through CIM 110 or browser can verify the downloaded or active contracts through the Process Orchestration Layer (POL) module 206 and Smart Contract Module 232.

A scenario of a user initiated deployment of a smart card may now be considered. A user may review the smart contract form downloaded automatically after connected registered smart device 112 and the appliance 104 may send that form including vendor id and device id to the financial institution 114 in a prescribed format who may then verify the existence of vendor 116 through vendor id as well the payload format. Financial institution 114 may then communicate with the appliance 104 further and issue a digital token to the appliance 104 who may then sign the token using the key stored in secured digital vault in the secured digital vault module 230 and sends it back to the financial institution 114. The financial institution 114 may then examine the digital signature and sets the user flag to TRUE and may further send the device id to the vendor 116. The vendor 116 may then confirm the device id and further send some data containing relevant user details back to financial institution 114. The financial institution 114 may again verify the data send by the vendor 116 and may send back to the vendor 116 the smart contract form encrypted with vendor's 116 public key. The vendor 116 may verify the form again and sign the token and sends it back to the financial institution 114. The financial institution 114 server may then verify the vendor 116 signature and set the vendor 116 consent flag to TRUE. On obtaining both vendor 116 and user consent, financial institution 114 server compiles the payload and deploys it as a smart contract on its node. A smart contract ID may be created and stored along with the contract address. Both are sent to the vendor 116 as well as the appliance 104. Smart contract may then be replicated on blockchain nodes of the vendor 116 and appliance 104 when they synchronize with blockchain node of the financial institution 114. Vendor 116 may check the deployed contract bytecode at contract address if required. Further, user through Customer Interaction Module (CIM) 110 or browser can verify the downloaded or active contracts thru the Process Orchestration Layer (POL) module 206 and Smart Contract Module 232.

The smart contract may further interact with external, non-blockchain entities through façade pattern where the smart contract may invoke standard URL or function in Process Orchestration Layer (POL) module 206. The smart contract listener function may then determine the payload and invoke necessary modules required to fulfil such a request.

An example of a smart contract deployment may now be considered. Suppose XYZ Washing Machine Vendor 116 and customer sign a pay by usage agreement that is being managed by a smart contract. For this, the vendor and a user may sign an agreement which is being managed by a smart contract. The vendor 116 may send user details to the financial institution 114 along with the vendor 116 device id who may then verify the existence of such a registered user and ownership of a connected registered smart appliance 112 and may then issue and send a token to the vendor 116. The vendor 116 digital may then sign the digital token and sends it back along with the smart contract form in a prescribed format encrypted with the financial institution 114 public key. The financial institution 114 server may then verify the vendor 116 signature and marks the vendor 116 consent flag to TRUE and may then decrypt form payload with financial institution 114 private key, checks validity of payload format and may then encrypt it with public key of the appliance 104. The financial institution 114 server may send encrypted form to the appliance 104 of the user along with the same token. The appliance 104 may then decrypt the form using smart contract and cryptography in smart contract module 232 and present it to user, whose consent may be obtained in customer interaction module (CIM) 110 or through Natural language Processing (NLP) module 212. The appliance 104 may then sign the token with appliance 104 private key and send it to the financial institution 116 along with the connected registered smart device 112 vendor id. The financial institution 114 server may then compare device id sent by the appliance 104 with that sent by vendor 116 earlier and verify appliance 104 signature and set user consent flag to TRUE. On obtaining both vendor 116 and user consent, financial institution 114 server compiles the payload and deploys it as a smart contract on its node. A smart contract ID may then be created and stored along with the contract address. Both are sent to the vendor 116 as well as the appliance 104. Smart contract may then be replicated on vendor 116 and appliance 104 blockchain nodes when they synchronize with the financial institution's blockchain node 114.

An example of a smart contract usage may now be considered. Suppose on 25th of the month, smart contract invokes standard uniform resource locator (URL) within the Smart Contract function in Process Orchestration Language (POL) module 206. Smart contract listener function in Process Orchestration Language (POL) module 206 may scan the payload and invokes the invoicing/mandate module to determine the metered washing machine usage and may further convey back the metered usage to the smart contract through JSON-RPC. This information may be sent as a transaction to the financial 114 institution node. Only the authorized financial institution 114 node can convert the transaction into a block on the blockchain. The block may be populated to appliance 104 node and the vendor 116 node during the next synchronization process. The payment for the usage may be by existing mandate set up with the financial institution 114 or balance loaded as cryptocurrency on the blockchain or through Smart contract initiating another request in Process Orchestration Language (POL) 206 to submit a payment.

According to yet another embodiment, the appliance 104 may provide various value added services. The appliance 104 may provide various offers to users without disclosing data from user's connected registered smart devices 112. Based upon user preferences and privacy concurrences, the appliance 104 may further leverage the financial institution's 114 data to provide offers to registered users and merchants. The appliance 104 may make criteria of which offer to be made to which class of user. The Scheduler module 234 may trigger the Process Orchestration Language (POL) module 206 to run analytics for determining what class of offers needs to be downloaded. Process Orchestration Language (POL) module 206 may further run the analytics engine 220 to determine usage pattern. It then invokes offers module to update Category Based Scoring Table. Process Orchestration Language (POL) module 206 may finally trigger the Personal Financial Management (PFM) module 224 to determine user goals. The appliance 104 then invokes offers module 236 to update Category Based Scoring Table. As an example, the Scheduler 234 may trigger the Process Orchestration Language (POL) module 206 to run analytics for determining what class of offers may be downloaded. Process Orchestration Language (POL) module 206 may then trigger the analytics engine 220 to determine usage pattern who determines that energy, power, laundry, e-commerce etc., as the top categories. The appliance 104 may then invoke offers module 236 to update category based scoring table. Number of washing machine cycles usage may also be recorded. Finally, the Process Orchestration Language (POL) module 206 may then trigger the personal financial management (PFM) module 224 to determine user goals which determines mortgage, auto etc., as the top categories and category based scoring table is updated accordingly.

The appliance 104 may also download metadata for example, in case of the smart washing machines—number of cycles, cycles per week, any patter of week day/week end usage to make various offers. For this, the Scheduler 234 may trigger the Process Orchestration Language (POL) module 206 to download the latest offers metadata from financial institution's database. The Process Orchestration Language (POL) module 206 may then invoke the offers engine 236 to download metadata which may comprise of vendor id, offer id, category and channel into metadata table. These offers may also comprise usage pattern offers like giving five cycles free if washing machine usage exceeds 50 cycles in a season.

According to yet another embodiment, the appliance 104 may also download the personalized offers for presenting them to users. For this, the Process Orchestration Language (POL) module 206 invokes offer engine 236 to start the process for offers download. The relevant data may then be selected from the metadata table for example a particular region of a country due to a merchant ecosystem or to promote a product or any other reason can participate in an offer to those who use five one hour cycles of ABC Brand Machine a week with ABC Brand Detergent at a low cost of $1 per gallon, based upon category based scoring table as well as user preferred channel for offers delivery. The offer content for selected data may then be downloaded. The Business Process Orchestration Layer (BPOL) 206 may use the financial interface module 208 for this purpose. The offer content may additionally include artwork images for offers presented on user interface or audio files for natural language based interference. These assets may be stored in offers metaart table. As an example, suppose the Process Orchestration Layer (POL) module 206 invokes offers engine 236 to invoke the process for offers download which may search for offers in the categories of energy, power, laundry, e-commerce, mortgage, mobile phones etc. that may be presented through natural language interface only as per the user preference. The offer content for selected data may then be downloaded using the financial interface module 208. Once the relevant offers relating to washing machine, auto loans etc., are found, the offer content as well associated audio.wav files for the same may be downloaded and stored in offers art meta table.

The offers may be presented when the user explicitly requests for offers by selecting the requisite option from user interface or requesting the same from the appliance 104 in a natural language. The offers may also be presented to user implicitly in user interface through a carousel or banner, or at the end of natural language conversation. As an example, offers on auto loans and washing machine usage (like 5 cycles free if the usage exceeds 50 cycles in a season) may be presented to the user at the end of natural language conversation.

Referring to FIG. 2, the architecture and functions of various modules forming the part of the appliance 104 may now be considered.

The Security/Authorization module 118 authenticates the connected registered smart devices 112 before they use the services of the financial appliance 104. This module also authenticates and authorizes the user when the customer interaction module 110 is used, or when the presence detection module 214 detects the presence of the user in the vicinity.

The Configuration module 202 helps the user configure the financial appliance 104 for miscellaneous tasks including setting expense limits, personal financial management goals, and so on.

The Financial Institution interface module 208 establishes secure connectivity pipe with the financial institution 114 infrastructure. The Financial Institution interface module 208 also includes logic for attempting idempotent retries and network error handling in case there is interim connectivity failure.

The Web Server module 242 helps rendering the data on the browser from any device. All the functionality provided by the firmware are accessible through this module.

The Application Programming Interface (API) module 204 exposes services of the financial appliance 104 in the form of Application Programming Interface API endpoints. This can be over http(s) or other Internet of Things (IoT) protocols like MQ Telemetry Transport (MQTT). This is the layer that first intercepts requests, and provides the response or acknowledgement. It also provides brokers or adapters to understand the request packets in different protocols and deliver payload in standard format to the business process orchestration layer.

The Process orchestration layer (POL) module takes the request payload from the application programming interface (API) layer. This is a critical module that orchestrates the right flow for the intended action using the modules it needs for the purpose.

The personal financial management (PFM) module 224 helps the user in better management of personal finances. This module helps set user goals and can help provide personalized offers through the offers module 236, or advice on affordability through the affordability algorithm in analytics engine module 220.

The invoice/mandate module 228 helps a vendor in creating a mandate to generate invoice at the client side using metered data from the registered connected smart devices 112.

The Offers module 236 creates a category-based scoring based on user goals set in personal financial management module (PFM) 224 as well as usage patterns determined by adaptive learning engine module 216. Accordingly, it may download the right set of offers along with associated meta-art. These offers may be displayed to the user in a conversation, or proactively, or passively in the customer interaction module 110 screens.

The device and vendor management module 226 helps in registering and managing connected registered smart devices 112 as well as vendors 116. Connected registered smart devices 112 can use the financial services offered by the financial appliance 104. Devices from registered vendors 116 can use appliance 104 services. Also, registered vendors 116 can participate in new business models such as pull payments.

The personal payment gateway 210 module makes a payment through the financial institution interface 208, or schedules a payment for later, based on request received externally through application programming interface (API), or generated by the invoice/mandate module 228.

The secured digital vault in secured digital vault module 230 helps in provisioning and secure storage of credentials like credit cards and debit cards to be used as funding sources in a transaction. The funding sources can be from the same financial institution providing the appliance 104 and auto-downloaded, or the user can explicitly enter funding sources from other financial institutions.

The natural language processing module 212 helps in establishing a dialogue with user in natural language offering an important channel of zero user interface (UI). It helps comprehend and process utterances from the user, as well as speak out the responses from the financial appliance 104.

The presence detection module 214 helps in detecting the presence of the user in the vicinity of the appliance 104, by virtue of the things carried by the user. Examples of such things include mobile phone or Bluetooth Low Energy enabled beacon, ECG based Nymi band in authenticated state, and so on.

The smart contract and blockchain module 232 helps implementing a blockchain node within the financial appliance 104. Other nodes can be, say with the financial institution 114 and the vendor 116. Smart contracts deployed on this blockchain help create new business models such as pay-by-usage.

The adaptive learning engine 216 helps understand the user and the ecosystem better through machine learning from the registered connected smart devices 112 data, as well as goals and preferences set by the user. Based on user opt-in and specific embodiment of the implementation, the adaptive learning engine 216 can also read through emails, as well as messages and notifications on the mobile phone.

The analytics engine 220 implements the payment advisory algorithm to recommend the right funding source for a transaction. Also, analytics engine 220 implements an affordability algorithm to provide right advice regarding big ticket purchases as well as helps in providing right offers to the user.

The rules engine module 218 handles rules like payment limits set by the user for handling transaction requests at a global level or at specific device level.

The scheduler module 234 layer helps in scheduling activities for multiple modules. Example, personal payment gateway 210 can use this module to schedule payments.

The alerts and messaging module 238 helps in sending remote notifications through email, SMS or push notifications, based on preferences set by the user.

The data management module 240 helps in managing the data lifecycle of all data handled by the financial appliance 104 including archival and purge. It also helps in rate management for continuous streaming data.

The firmware manager module 222 helps in configuring the right firmware modules based on the platform of installation. Also, the firmware manager module 222 helps in performing firmware updates.

What is claimed is:

1. A system comprising:
   one or more memory devices; and
   one or more processors coupled to the one or more memory devices, the one or more processors being configured to execute instructions stored in the one or more memory devices to perform operations comprising:
   configuring, at least one appliance by using a customer interface module (CIM), to provide at least one interface, wherein the at least one interface is configured to receive one or more inputs from a user;
   configuring, by using a configuration module, the at least one appliance by the configuration module and registering one or more connected devices to an Internet of Things (IoT) platform, wherein the at least one appliance and the one or more connected devices are configured and registered through one or more communication channels, wherein the CIM enables creation of personal preferences for each of the registered at least one appliance and the one or more connected devices;
   authenticating the user and one or more connected registered devices and providing, by using a security module, one or more entitlements specific to the user and the one or more connected registered devices;
   receiving, by an application programming interface (API) module, one or more requests from the one or more connected registered devices;
   analyzing, by a process orchestration layer (POL) module, the one or more requests received from the API module, and enabling one or more functionalities based on the one or more requests and validating the one or more requests using a security mechanism or the one or more entitlements, wherein the security mechanism authenticates the one or more connected registered devices prior to usage of one or more services of the at least one appliance, wherein based on the one or more requests, the POL module triggers the one or more connected devices for activation of the at least one appliance;

determining, by the POL module, if the one or more requests received appear as outlier requests or suspicious requests based on historical data stored in a database corresponding to the one or more connected registered devices from which the one or more requests are received;

processing, by an input processing module, the one or more inputs from the user, wherein the one or more inputs are specific to the one or more services to be provided to the user through the one or more connected registered devices, wherein the one or more inputs are in form of a user utterance, the one or more inputs in turn facilitate the at least one appliance to extract the user utterance and context associated with the user utterance is mapped to an intent to utilize the one or more services;

processing, by a personal payment gateway (PPG) module, payment pertaining to the one or more services subscribed by the user through the at least one appliance, wherein the information specific to the payment is obtained based on configuration preferences stored in the database, and the one or more services being analyzed by the POL module, wherein the POL module determines an optimal funding source from a plurality of funding sources registered in the CIM by the user, for the payment based on payment transaction details, customer preferences, and funding source attributes, wherein the POL module determines whether user interference is required to process the payment, wherein the POL module directly invokes the PPG module to process the payment, when it is determined that the user interference is not required to process the payment, and wherein the POL module invokes the PPG module to process the payment only after the user approves the payment, when it is determined that the user interference is required to process the payment, wherein the at least one appliance acts as a virtual finance assistant to the user and provides inputs for a financial need of the customer;

detecting, by a presence detection module, presence of the user within a proximity of the at least one appliance, by virtue of things carried by the user, and transmitting the one or more requests to the user upon authenticating and authorizing the user, wherein the things carried by the user include at least one of a mobile communication device, a Bluetooth Low Energy enabled beacon and a wearable device, and wherein the user is authenticated and authorized via at least one of SMS confirmation, a call to user's mobile communication device and biometric authentication, wherein the presence of the user involves triggering of one or more authentication modes when the user intervention is required;

downloading, by the POL module, latest offers from a third-party database, based on the one or more services utilized by the user, wherein the POL module downloads the latest offers from the third-party database, without disclosing user data from the one or more connected devices; and recommending, by the POL module, targeted offers to the user from the downloaded latest offers, based on a usage pattern of the one or more services utilized by the user and user goals, wherein the targeted offers are presented to the user i) when the user explicitly requests by selecting a requisite option from CIM user interface, or ii) when the user explicitly requests the appliance in a natural language, or iii) implicitly in the CIM user interface as a carousel or banner, or iv) at the end of a natural language conversation, wherein the downloaded latest offers include offer content in a form including artwork images for presenting via the CIM user interface and audio files for presenting via the natural language conversation, and wherein the POL module stores the artwork images and audio files in a meta-art table, wherein the POL module runs analytics for determining types of classes of offers to be downloaded, and wherein the POL module determines top categories of the user goals based on the usage patterns and the at least one appliance in turn updates a category based scoring table.

2. The system of claim 1, further comprising generating, by using an adaptive learning engine, one or more customized responses for the one or more outlier requests based on the historical data stored in the database.

\* \* \* \* \*